April 17, 1945.           L. DEL RICCIO           2,373,815
SCANNING LENS
Filed April 24, 1942                2 Sheets-Sheet 1
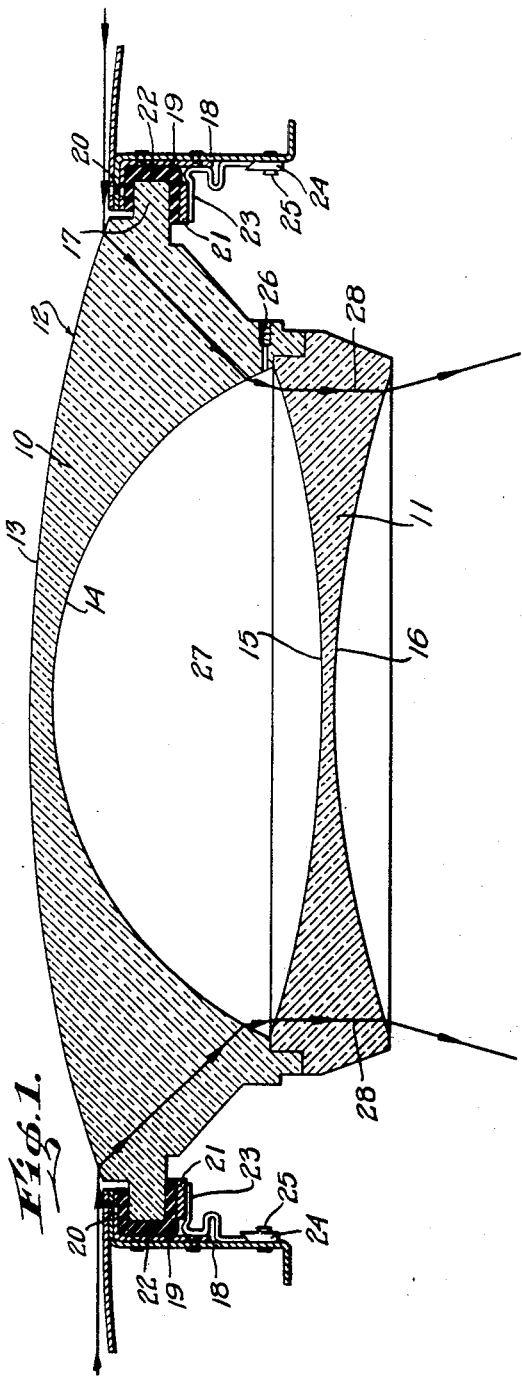
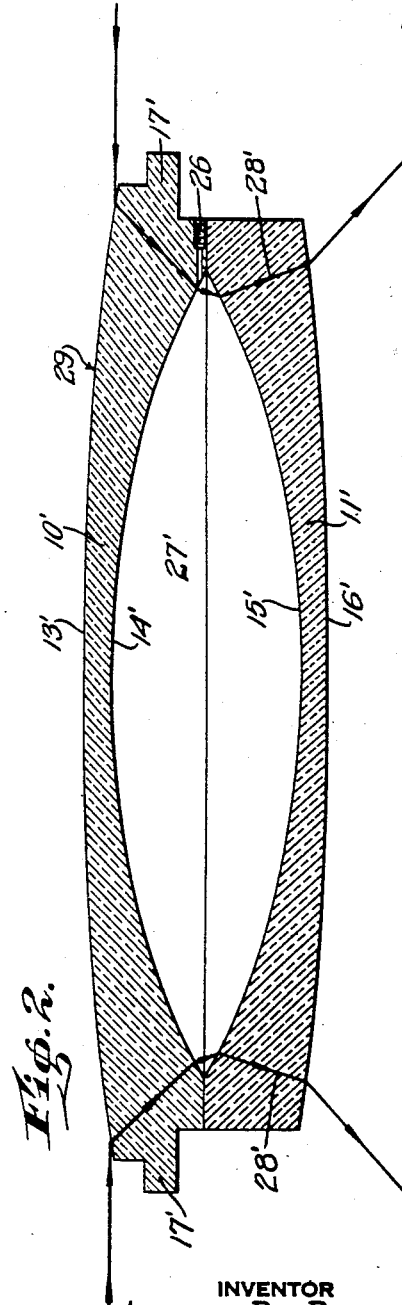
INVENTOR
LORENZO DEL RICCIO
BY
ATTORNEYS April 17, 1945.   L. DEL RICCIO   2,373,815
SCANNING LENS
Filed April 24, 1942   2 Sheets-Sheet 2
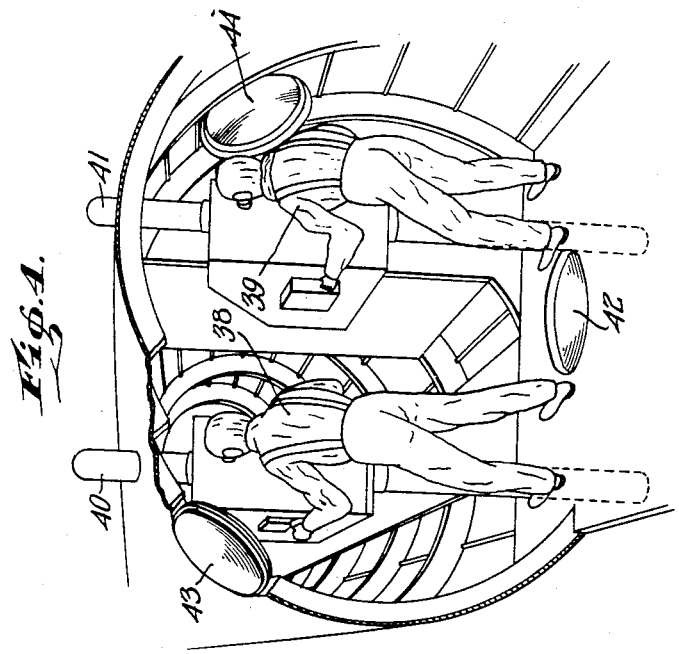
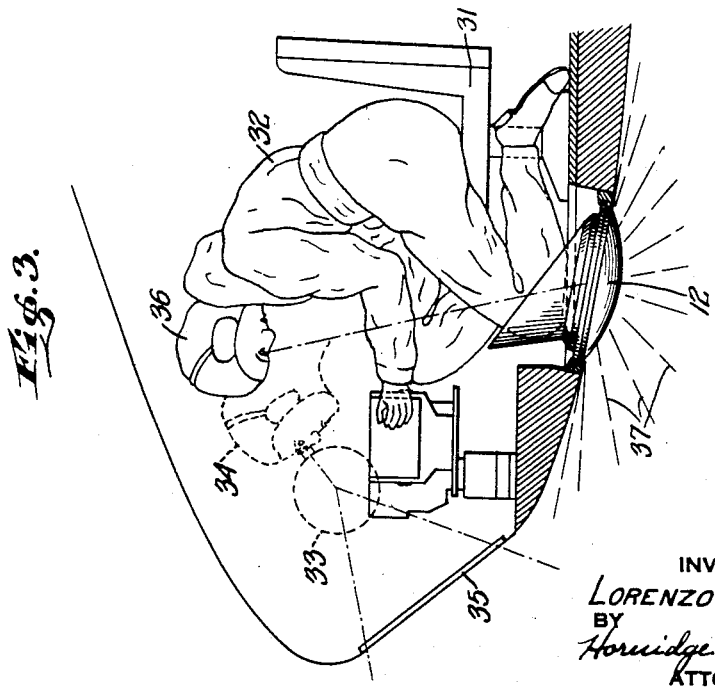
INVENTOR
LORENZO DEL RICCIO
BY
ATTORNEYS Patented Apr. 17, 1945

2,373,815

UNITED STATES PATENT OFFICE 2,373,815

SCANNING LENS

Lorenzo del Riccio, Los Angeles, Calif.

Application April 24, 1942, Serial No. 440,385

19 Claims. (Cl. 88—57)

In the use of aeroplanes for war purposes, particularly those of the bomber type, which are enclosed and carry a crew of a substantial number, it is necessary that certain of the personnel within the plane should, during flight, have as wide a view of the outside as possible, for instance, in order to note the proximity of enemy aeroplanes coming from all directions. At the same time, with the desirability of protecting the aeroplane from vulnerability by armoring it, and reducing the number of weak spots due to windows or openings, such extensive view would be rendered difficult, if not impossible, through a relatively few small windows or portholes set in the walls of the aeroplane body, where the angle of view is limited by the small size of such windows or portholes and by the distance of an observer's position behind such windows or portholes, which position he must constantly be changing in his efforts to look through the window or porthole in an upward, downward, fore and aft direction. This is a difficult operation, particularly when the same member of the crew has another operation to perform in accordance with the conditions taking place outside the aeroplane, and to afford any sort of satisfactory view in all directions, about four observers would be required stationed at as many windows or portholes located respectively in the bottom, top and both sides of the aeroplane body, and their entire attention would be required in observation and the communication of the results of their observation to the other members of the personnel charged with the duty of acting in accordance with observed conditions outside, such, for instance, as the pilot, gunner, etc.

To overcome such limited angle of vision, and in many cases to give the operator of a particular mechanism, for instance, the pilot who steers the aeroplane, or the gunner who aims and fires the gun at an enemy aeroplane, the opportunity to quickly see and locate an enemy aeroplane above or below and behind him, I have provided a novel form of scanning lens which may be mounted in the outer wall of the aeroplane body and which will give to the observer positioned behind it at a single glance an angle of view of 180° or a view substantially that of a hemisphere without changing his position.

A further object of my invention is to provide such a lens that will consist of but few parts, and, despite the relatively large size required, may be cheaply and quickly constructed.

A still further object of my invention is to provide such a lens with an outside spherical surface of long radius so that said lens may be mounted more or less flush with the outside surface of the aeroplane body to minimize aero-dynamic drag.

A further object of my invention is to provide such a lens of a minimum over all thickness with an air space between the lens elements which will act as an insulator against the outside cold present at great heights and which will provide an air cushion between said elements and to provide means whereby said air space may be dehydrated to prevent fogging.

Other and further objects will be apparent from the following description of my invention, taken in connection with the annexed drawings, in which Fig. 1 is a vertical section on the optical axis of one form of the lens of my invention, Fig. 2 is a vertical section on the optical axis of another form of the lens of my invention, Fig. 3 is a vertical section of the front portion of the inside of an aeroplane showing the lens of my invention mounted in the floor of the aeroplane for use in connection with a bomb-sight, Fig. 4 is a perspective view of a portion of the inside of an aeroplane showing two gunners standing at their posts of operation with a plurality of lenses of my invention mounted in proximity to them in the side walls and bottom of the aeroplane.

Referring to Fig. 1, 10 is the outer and 11 is the inner of two elements comprising the scanning lens, which may be generally referred to by the numeral 12. The lens 12 has a diameter and entrance pupil of 15 inches and because of the great weight of glass and the fact that it is to be used in an aeroplane where lightness is an important factor and for other reasons, I prefer to use a transparent plastic well known by the trade name "Lucite," which has a refractive index of from 1.49 to 1.5, or any suitable methyl methacrylate resin or other plastic having substantially the same refractive index, as the substance out of which the elements 10 and 11 may be molded, cast or machined or ground. Such substances are very much lighter than glass and possess in a high degree characteristics making them suitable for such lens purposes. The two surfaces of each of the elements are spherical. The element 10 is a negative meniscus and the outer convex surface 13 of the element 10 is on a radius of 24¾ inches, while its inner surface 14 is on a radius of 5.7 inches. Its thickness on the optical axis is ½ inch. The element 11 is a double concave lens, both its surfaces 15 and 16 being on a radius of 17 inches, while its thickness on its optical axis is $\frac{7}{8}$ inch. Both elements are cemented together at the line of intersection of their opposed concave surfaces and for some distance radially therefrom, so as to leave a sealed air space 27 between them measuring $4\frac{7}{32}$ inches on their common optical axes. The element 10 has a flanged portion 17 extending radially therefrom around its outer periphery, at a convenient distance beneath its outer surface, for mounting purposes and may be mounted in a circular bracket attached to the wall of the aeroplane body adjacent the circular opening therein to receive the lens 12. Said bracket consists of two members 18 and 19, bent as shown, and attached to each other and to the wall of the aeroplane body by rivets 20. The flange 17 is held between the two inner sides of the member 19 and the flat ring 21 with an intervening U-shaped ring 22 of rubber or other resilient material by means of a plurality of circumferentially distributed flat springs 23 which are held in position by the keepers 24 having a bevelled upper surface conforming to a bevel on the lower end of the flat spring 23 and fastened to the member 18 by means of the screw 25. The lens 12 is thus resiliently mounted in the wall of the aeroplane from which it can be readily removed by removing the keeper 24 by means of the screw 25. 26 is a bore extending from the perimeter of the lens 12 into the air space 27 between the elements, whereby the said air space is vented to the inside of the aeroplane body and is threaded as shown whereby a vent line may be connected to a tube containing "silica jell" or other suitable dehydrating agent, in order to prevent fogging between the lens elements. In the case of pressure cabins, the outside lens element 10 supports the air pressure directly while the rear element acts as a stiffener against deflection.

With the lens 12 in position in the wall of the aeroplane body and by noting the path of the ray 28 falling upon the element 10 near the margin of its surface at an angle of 90° to the optical axis of said lens, it will be clear that an observer positioned a convenient distance behind and looking towards element 11 along the optical axis of the lens 12, or at a slight angle close thereto, will see a minified image of all objects lying in all directions within an angle of 180° to the optical axis of the said lens. In fact, experiment has proved that the visual angle of said lens exceeds 180° so that objects lying somewhat behind the plane of the perimeter of the spherical surface of the element 10 may also be seen in the element 11.

In Fig. 2 I have shown another form of the lens of my invention, which is similar in most respects to the lens 12 of Fig. 1, and is designated generally by the numeral 29. Lens 29 is made of the same material as that of lens 12 and consists of two negative lens elements $10^1$ and $11^1$ cemented together, with an air space $27^1$ between, which is vented in a similar way to that of lens 12. The lens 29 also has a diameter and entrance pupil of 15 inches and the two surfaces of each of the elements $10^1$ and $11^1$ are also spherical but the other data differs from that of lens 12 in the following respects. Both elements $10^1$ and $11^1$ are concavo-convex in form. The outer convex surface $13^1$ of the element $10^1$ is on a radius of 56 inches while its inner concave surface $14^1$ is on a radius of $13\frac{1}{2}$ inches, while its thickness on its optical axis is $\frac{23}{64}$ inch. The concave surface $15^1$ of the element $11^1$ is on a radius of $13\frac{1}{2}$ inches and its convex surface $16^1$ is on a radius of 56 inches. Both elements are cemented together at the line of intersection of their opposed concave surfaces and for some distance radially therefrom so as to leave the sealed air space $27^1$ between them, said air space measuring $3\frac{7}{32}$ inches along the common optical axis of the elements $10^1$ and $11^1$. The element $10^1$ is provided with a flanged portion $17^1$ extending radially therefrom around its outer periphery at a convenient distance from its outer surface $13^1$ whereby the said lens 29 may be resiliently and removably mounted in the outer wall of the aeroplane body in a manner similar to that in which the lens 12 is so mounted.

With the lens 29 in position in the wall of the aeroplane body, by noting the path of the ray $28^1$ falling upon the element $10^1$ near the margins of its surface at an angle of 90° to its optical axis, it will be clear that an observer positioned a convenient distance behind and looking towards the element $11^1$ along the optical axis of the lens 29, or at a slight angle thereto, will, in a way similar with respect to lens 12 as abovementioned, see a minified image of all objects lying in all directions with an angle of 180° to the optical axis of the said lens 29, and to some extent in excess of said angle of 180°.

While I have described lenses having an entrance pupil and diameter of 15 inches in the plane of the perimeter of the outer spherical surface of said lenses 12 and 29, they may be made in sizes of greater or less diameter by changing the lengths of the various radii above given proportionately to such less or greater diameter.

In Fig. 3 I have shown the scanning lens 12 of my invention installed in the bottom of the front end of the aeroplane body in front of the seat 31 and between the legs of the bombadier 32 seated in front of a bomb-sight 33. The dotted line 34 illustrates the position of his head when looking through the bomb-sight 33 and through the window 35 in front of the aeroplane. This gives him a normal angle of view through said bomb-sight 33 but by merely retracting his head to the position shown in full lines 36 and looking downward on the lens 12 of my invention, he has a more extensive view as shown by the rays 37 extending in all directions within an angle of 180° of the plane of the bottom of the aeroplane body in which the said lens 12 of my invention may be mounted, thus enabling the bombadier 32 to see not only what is visible to him through the bomb-sight 33 and the window 35 but also giving him a general picture of what lies in front, behind and on both sides of the aeroplane.

In Fig. 4 I have shown two gunners 38 and 39, at their posts of operation, in which ordinarily the only view obtainable would be through the upper and lower periscopic gun-sights 40 and 41 for aiming and firing the guns operated by them so that their view is obviously limited to the fields of view of the said periscopic gun-sights, which, as is well known, are limited to a narrow angle of view and take in views of only that upon which they have been turned. With the installation, however, of three of the lenses of my invention, one, 42, in the bottom, and two, 43 and 44, in the side walls adjacent the heads of said gunners, respectively, in the aeroplane body, it can be seen that the said gunners, by glancing at the lens 42 in the bottom and at the lenses 43 and 44 in the side walls, will have a view of objects located in substantially all directions of the aeroplane and with this field of observation, which might disclose an enemy aeroplane approaching, for instance, from above and the rear, the said gunners may quickly and accurately turn their said periscopic gun-sights to aim their guns upon such enemy aeroplane and thus obviate the critical delay between the announcement by an observer looking through a window or porthole of the aeroplane and then searching with their said periscopic gun-sights for the enemy aeroplane in accordance with the information communicated to them by such observer.

In accordance with the modern design of aeroplanes, there is no practical method of maintaining an observer to the rear of the aeroplane and particularly to the rear and down. This difficulty may be obviated by the lens of my invention, which may be mounted in the floor of the aeroplane body at the rear, and if a sufficiently large diameter lens is used, the lower hemisphere can be observed simultaneously by several members of the crew, either from a sitting or standing position. Another one of the lenses of my invention may be installed in the top of the aeroplane body adjacent its rear and with the aid of two observers, one looking at the upper lens and the other looking at the lower lens, both the upper and lower hemisphere may be simultaneonsly viewed by such members of the crew.

The effectiveness of a continuous observer on a flight of long duration is obviously considerably greater when the aeroplane is equipped with the lenses of my invention and the strain on the eyes and nerves is substantially lessened.

While I have described the scanning lens of my invention in terms of its adaptability to aeroplanes, it will be noted that it is similarly adapted for use in tanks, boats and other devices and under all conditions wherever a visual image of 180° is desirable.

It will be understood that the sectors of the lens of my invention may be used with equal effectiveness when only a portion of the hemisphere vision is desired.

While there will be some distortion of the image seen through the lens of my invention, it presents no serious handicap to its use for the purposes mentioned since, after a little practice, an observer may discount such aberration and interpret the image seen in terms of the true location of the objects.

Many changes may be made in my said invention without departing from the spirit thereof as defined in the appended claims.

It will be seen that the scanning lens system, including its mounting, embodying applicant's invention, constitutes what may be termed a port-light, by analogy to the port-lights used in ship's cabins, particularly when applied to the port-hole in the wall of the body of an aeroplane. It serves to close the port to complete the wall, and at the same time admits outside light to illuminate the interior of the body of the aeroplane. Furthermore, it not only permits an observer within the body of the aeroplane to see the outside view, but, in its best embodiment greatly increases the field of view and allows the observer to see this view without the necessity of shifting his position, and by merely turning the head slightly.

In its embodiment as a port-light for aeroplanes, it most fully utilizes the advantages of the invention, as will be fully understood by those skilled in the art from the description hereinbefore set forth. It is to be noted that the aeroplane port-light of applicant's invention comprises a mounting, an outer lens whose exterior surface is convex and spherical, and projects somewhat beyond the mounting, to such an extent, that when in use such convex surface will project beyond the wall of the aeroplane body, in order to receive rays of light incident at the said surface at angles up to 90° from the principal optical axis. Furthermore, by making the exterior surface convex on a relatively large radius, the amount of projection, at the principal optical axis, which is the maximum, is not so great as to materially affect the stream lines of the aeroplane body.

The interior surface of the lens system is open to the view of an observer within the body of the aeroplane, and therefore serves as a view surface on which appears a view, reduced in size, of the wide field of view of the outer lens, the reduction, as hereinbefore described, being such as to bring a visual image of the outside view within the vision of an observer located at a fixed position, without necessitating the shifting of his position, and, at most, by merely turning his head slightly.

With such a port-light in an aeroplane, any relative movement of another aeroplane in the visual image will immediately attract the attention of the observer to that portion of the view.

I claim:

1. A scanning lens for creating a visual image of a field of view of 180°, comprising an outer and an inner spherical lens element composed of Lucite, the outer lens element being a negative meniscus of approximately 15 inches in diameter having its outer surface formed on a radius of 24¾ inches and its inner surface formed on a radius of 5.7 inches, the thickness of said lens element along its optical axis being $\frac{11}{12}$ inch, and the inner element being double concave with its two surfaces formed on a radius of 17 inches and having a thickness along its optical axis of $\frac{3}{16}$ inch, said lens elements being mounted co-axially with the concave surface of the outer lens element opposed to a concave surface of the inner lens element whereby an air space is formed between them measuring $4\frac{7}{32}$ inches along the common optical axis of said lens elements.

2. A scanning lens for creating a visual image of a field of view of 180°, comprising an outer and inner spherical lens element, the outer lens element being a negative meniscus of approximately 15 inches in diameter having its outer surface formed on a radius of 24¾ inches and its inner surface formed on a radius of 5.7 inches, the thickness of said lens element along its optical axis being $\frac{11}{12}$ inch, and the inner element being double concave with its two surfaces formed on a radius of 17 inches and having a thickness along its optical axis of $\frac{3}{16}$ inch, said lens elements being mounted co-axially with the concave surface of the outer lens element opposed to a concave surface of the inner lens element whereby an air space is formed between them measuring $4\frac{7}{32}$ inches along the common optical axis of said lens elements.

3. A scanning lens for creating a visual image of a field of view of 180°, comprising an outer and an inner spherical lens element, composed of Lucite, the outer lens element being a negative meniscus of approximately 15 inches in diameter having its outer surface formed on a radius of 24¾ inches and its inner surface formed on a radius of 5.7 inches, the thickness of said lens element along its optical axis being $\frac{11}{12}$ inch, and the inner element being double concave with its two surfaces formed on a radius of 17 inches and having a thickness along its optical axis of $\frac{3}{16}$ inch, said lens elements being mounted co-axially with the concave surface of the outer lens element opposed to a concave surface of the inner lens element whereby an air space is formed between them measuring $4\frac{7}{32}$ inches along the common optical axis of said lens elements, and means for venting said air space.

4. A scanning lens for creating a visual image of a field of view of 180°, comprising an outer and an inner spherical lens element, both of said lens elements being negative meniscus lenses of approximately 15 inches in diameter having their convex surfaces each formed on a radius of 56 inches and their concave surfaces each formed on a radius of 13½ inches, the thickness of each of said lens elements along its optical axis being $\frac{23}{64}$ inch, said lens elements being mounted co-axially with their concave surfaces opposite each other, whereby an air space is formed between them measuring $4\frac{7}{32}$ inches along the common optical axis of said lens elements.

5. A scanning lens for creating a visual image of a field of view of 180°, comprising an outer and an inner spherical lens element composed of Lucite, both of said lens elements being negative meniscus lenses of approximately 15 inches in diameter having their convex surfaces each formed on a radius of 56 inches and their concave surfaces each formed on a radius of 13½ inches, the thickness of each of said lens elements along its optical axis being $\frac{23}{64}$ inch, said lens elements being mounted co-axially with their concave surfaces opposite each other, whereby an air space is formed between them measuring $4\frac{7}{32}$ inches along the common optical axis of said lens elements.

6. A scanning lens for creating a visual image of a field of view of 180°, comprising an outer and an inner spherical lens element composed of Lucite, both of said lens elements being negative meniscus lenses of approximately 15 inches in diameter having their convex surfaces each formed on a radius of 56 inches and their concave surfaces each formed on a radius of 13½ inches, the thickness of each of said lens elements along its optical axis being $\frac{23}{64}$ inch, said lens elements being mounted co-axially with their concave surfaces opposite each other, whereby an air space is formed between them measuring $4\frac{7}{32}$ inches along the common optical axis of said lens elements, and means for venting said air space.

7. A scanning lens for creating a visual image of a field of view of 180°, comprising an outer and an inner spherical lens element composed of a methyl methacrylate resin, the outer lens element being a negative meniscus of approximately 15 inches in diameter having its outer surface formed on a radius of 24¾ inches and its inner surface formed on a radius of 5.7 inches, the thickness of said lens element along its optical axis being ½ inch, and the inner element being double concave with its two surfaces formed on a radius of 17 inches and having a thickness along its optical axis of $\frac{3}{16}$ inch, said lens element being mounted co-axially with the concave surface of the outer lens element opposed to a concave surface of the inner lens element whereby an air space is formed between them measuring $4\frac{7}{32}$ inches along the common optical axis of said lens elements.

8. A scanning lens for creating a visual image of a field of view of 180°, comprising an outer and an inner spherical lens element composed of a methyl methacrylate resin, the outer lens element being a negative meniscus of approximately 15 inches in diameter having its outer surface formed on a radius of 24¾ inches and its inner surface formed on a radius of 5.7 inches, the thickness of said lens element along its optical axis being ½ inch, and the inner element being double concave with its two surfaces formed on a radius of 17 inches and having a thickness along its optical axis of $\frac{3}{16}$ inch, said lens elements being mounted co-axially with the concave surface of the outer lens element opposed to a concave surface of the inner lens element whereby an air space is formed between them measuring $4\frac{7}{32}$ inches along the common optical axis of said lens elements, and means for venting said air space.

9. A scanning lens for creating a visual image of a field of view of 180°, comprising an outer and an inner spherical lens element composed of a methyl methacrylate resin, both of said lens elements being negative meniscus lenses of approximately 15 inches in diameter having their convex surfaces each formed on a radius of 56 inches and their concave surfaces each formed on a radius of 13½ inches, the thickness of each of said lens element being mounted co-axially with their concave surfaces opposite each other, whereby an air space is formed between them measuring $4\frac{7}{32}$ inches along the common optical axis of said lens elements.

10. A scanning lens for creating a visual image of a field of view of 180°, comprising an outer and an inner spherical lens element composed of a methyl methacrylate resin, both of said lens elements being negative meniscus lenses of approximately 15 inches in diameter having their convex surfaces each formed on a radius of 56 inches and their concave surfaces each formed on a radius of 13½ inches, the thickness of each of said lens elements along its optical axis being $\frac{23}{64}$ inch, said lens elements being mounted co-axially with their concave surfaces opposite each other, whereby an air space is formed between them measuring $4\frac{7}{32}$ inches along the common optical axis of said lens elements, and means for venting said air space.

11. A scanning lens for creating a visual image of a field of view of 180°, comprising an outer and an inner spherical lens element composed of a methyl methacrylate resin, the outer lens element being a negative meniscus and the inner lens element having at least one of its surfaces concave, said lens element being mounted co-axially with their concave surfaces opposite each other to form an air space between them, the radii of the two surfaces of each of said lens elements being such that a ray incident upon the convex surface of said outer lens element at an angle of 90° to the optical axis of said element will be refracted therethrough and across said air space to fall upon the concave surface of said inner lens element and be refracted therethrough to emerge at a diverging angle.

12. A scanning lens for creating a visual image of a field of view of 180°, comprising an outer and an inner spherical lens element, both of said lens elements being negative menisci lenses mounted co-axially with their concave surfaces facing each other to form an air space between them, the radii of the two surfaces of each of said lens elements being such that a ray incident upon the convex surface of said outer lens element at an angle of 90° to the optical axis of said element will be refracted therethrough and across said air space to fall upon the concave surface of said inner lens element and be refracted therethrough at a diverging angle.

13. A scanning lens for creating a visual image of a field of view of 180°, comprising an outer and an inner spherical lens element, both of said lens elements being negative menisci lenses having substantially the same diameters and radii of their respective convex and concave surfaces, the said lens elements being mounted co-axially, one upon the other, with their concave surfaces facing each other to form an air space between them, the radii of the two surfaces of each of said lens elements being such that a ray incident upon the convex surface of said outer lens element at an angle of 90° to the optical axis of said element will be refracted therethrough and across said air space to fall upon the concave surface of said inner lens element and be refracted therethrough to emerge at a diverging angle.

14. A scanning lens for creating a visual image of a field of view of 180°, comprising an outer and an inner spherical lens element, both of said lens elements being negative menisci lenses having substantially the same diameters and radii of their respective convex and concave surfaces, the said lens elements being mounted co-axially, one upon the other, with their concave surfaces facing each other to form an air space between them, the radii of the two surfaces of each of said lens elements being such that a ray incident upon the convex surface of said outer lens elements at an angle of 90° to the optical axis of said element will be refracted therethrough and across said air space to fall upon the concave surface of said inner lens element and be refracted therethrough to emerge at a diverging angle, and means for venting said air space.

15. A scanning lens for creating a visual image of a field of view of 180°, comprising an outer and an inner spherical lens element, both of said lens elements being negative menisci lenses having substantially the same diameters and radii of their respective convex and concave surfaces, said lens elements being mounted co-axially one upon the other with their concave surfaces facing each other to form an air space between them, the radius of the convex surface of said outer lens being such that a ray incident upon such surface at an angle of 90° to the optical axis of said lens will be refracted therethrough and across said air space to fall upon the concave surface of said inner lens, and the radius of the concave surface of said inner lens being substantially one-quarter of the radius of said convex surface of said outer lens.

16. A scanning lens for creating a visual image of a field of view of 180°, comprising an outer and an inner spherical lens element, both of said lens elements being negative menisci lenses having substantially the same diameters and radii of their respective convex and concave surfaces, said lens elements being mounted co-axially one upon the other with their concave surfaces facing each other, the radius of the concave surface of each of said lenses being substantially one-quarter of the radius of curvature of its convex surface, and the radius of the convex surface of each of said lenses being substantially in the ratio of 3¾ to 1 to the diameter of said outer lens in the plane of the perimeter of its convex surface.

17. A port light for airplanes comprising a mounting arranged to be secured at a port in an outer wall of an airplane body, and a lens system for creating a visual image of a field of view of 180° carried by said mounting, said lens system comprising an outer and an inner spherical lens, both of said lens elements being negative menisci lenses having substantially the same diameters and radii of their respective convex and concave surfaces, the said lens elements being mounted co-axially, one upon the other with their concave surfaces facing each other, their convex surfaces each being formed on a radius substantially in the ratio of 3¾ to 1 to the diameter of said outer lens in the plane of the perimeter of its convex surface, and their concave surfaces each being formed on a radius substantially one-quarter of the radius of said convex surface, the convex surface of the said inner lens being exposed to view of an observer.

18. A scanning lens for creating a visual image of a field of view of 180°, comprising an outer and an inner spherical lens element, both of said lens elements being negative menisci lenses having substantially the same diameters, radii of their respective convex and concave surfaces and thickness along their optical axes, said lens elements being mounted co-axially one upon the other with their concave surfaces opposite each other whereby an air space is formed between them, the radii of the convex and concave surfaces of each of said lens elements, and the thickness of each of said lens elements along its optical axis being substantially proportioned respectively to the following approximate corresponding data for a like lens having a diameter of approximately 15 inches, namely, radius of convex surface 56 inches, radius of concave surface 13½ inches, thickness along optical axis 23/64 inch, in the ratio of its diameter to said diameter of approximately 15 inches.

19. A scanning lens for creating a visual image of a field of view of 180°, comprising an outer and an inner spherical lens element composed of Lucite, both of said lens elements being negative menisci lenses having substantially the same diameters, radii of their respective convex and concave surfaces and thickness along their optical axes, said lens elements being mounted co-axially one upon the other with their concave surfaces opposite each other whereby an air space is formed between them, the radii of the convex and concave surfaces of each of said lens elements, and the thickness of each of said lens elements along its optical axis being substantially proportioned respectively to the following approximate corresponding data for a like lens having a diameter of approximately 15 inches, namely, radius of convex surface 56 inches, radius of concave surface 13½ inches, thickness along optical axis 23/64 inch, in the ratio of its diameter to said diameter of approximately 15 inches.

LORENZO DEL RICCIO.